United States Patent
Sakai

(10) Patent No.: US 11,807,106 B2
(45) Date of Patent: Nov. 7, 2023

(54) CONTROL DEVICE, CONTROL METHOD, AND RECORDING MEDIUM

(71) Applicant: HONDA MOTOR CO., LTD., Tokyo (JP)

(72) Inventor: Ryoji Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 302 days.

(21) Appl. No.: 17/210,568

(22) Filed: Mar. 24, 2021

(65) Prior Publication Data

US 2021/0300187 A1 Sep. 30, 2021

(30) Foreign Application Priority Data

Mar. 31, 2020 (JP) .................... 2020-063591

(51) Int. Cl.
*B60L 15/00* (2006.01)
*B60L 15/20* (2006.01)
*B60L 50/75* (2019.01)
*B60Q 9/00* (2006.01)

(52) U.S. Cl.
CPC ............ *B60L 15/20* (2013.01); *B60L 50/75* (2019.02); *B60Q 9/00* (2013.01); *B60L 2250/00* (2013.01)

(58) Field of Classification Search
CPC .......... B60L 15/20; B60L 50/75; B60L 50/60; B60L 50/70; B60L 2250/00; B60L 2250/12; B60L 2250/16; B60L 58/40; B60L 53/305; B60Q 9/00; Y02T 10/70; Y02T 10/7072; Y02T 10/72; Y02T 90/16; Y02T 90/40; Y02T 90/12

See application file for complete search history.

(56) References Cited

U.S. PATENT DOCUMENTS

| 6,484,088 B1 * | 11/2002 | Reimer | B60K 15/077 701/123 |
| 7,693,651 B2 * | 4/2010 | Proefke | B60W 50/08 701/123 |
| 7,966,121 B2 * | 6/2011 | Aoyagi | H01M 8/04313 701/123 |

(Continued)

FOREIGN PATENT DOCUMENTS

JP 2016-036235 3/2016

*Primary Examiner* — Phutthiwat Wongwian
*Assistant Examiner* — Sherman D Manley
(74) *Attorney, Agent, or Firm* — AMIN, TUROCY & WATSON, LLP

(57) ABSTRACT

A control device is a control device of a moving body that includes a first accumulation unit configured to accumulate first energy, a second accumulation unit configured to accumulate second energy different from the first energy, and an electric motor configured to generate power to move using any one or both of second energy obtained by converting first energy accumulated in the first accumulation unit and second energy accumulated in the second accumulation unit, in which a required amount, which is an amount of the second energy required to move from a current place to a supply point that is a point where supply of the first energy is received, is acquired when the second energy is accumulated in the second accumulation unit and, if the required amount has been supplied to the second accumulation unit, a termination-related operation related to termination of the supply is executed.

10 Claims, 3 Drawing Sheets

(56) References Cited

U.S. PATENT DOCUMENTS

| | | | | |
|---|---|---|---|---|
| 8,504,236 B2* | 8/2013 | Guo | G01C 21/3697 | 701/123 |
| 9,789,775 B2* | 10/2017 | Kim | B60L 58/30 | |
| 9,909,913 B2* | 3/2018 | Tomita | B60W 40/00 | |
| 10,351,000 B2* | 7/2019 | Berentsen | B60W 50/0097 | |
| 10,493,861 B2* | 12/2019 | Cun | B60L 53/66 | |
| 11,332,036 B2* | 5/2022 | Perrone | G01R 31/382 | |
| 2002/0162694 A1* | 11/2002 | Iwasaki | B60L 58/15 | 429/430 |
| 2004/0008109 A1* | 1/2004 | Endoh | B60R 16/0232 | 340/450.2 |
| 2004/0062963 A1* | 4/2004 | Umayahara | B60L 58/30 | 429/429 |
| 2005/0149250 A1* | 7/2005 | Isaac | G01C 21/3679 | 701/32.3 |
| 2006/0185756 A1* | 8/2006 | Sato | B60S 5/02 | 141/94 |
| 2007/0007058 A1* | 1/2007 | Uenodai | B60K 28/16 | 180/65.28 |
| 2007/0176762 A1* | 8/2007 | Aoyagi | H01M 8/04589 | 340/439 |
| 2007/0199747 A1* | 8/2007 | Aoyagi | H01M 8/04761 | 429/513 |
| 2008/0234888 A1* | 9/2008 | Zanardelli | H04L 43/0817 | 701/34.2 |
| 2012/0111447 A1* | 5/2012 | Mori | F17C 3/025 | 141/82 |
| 2013/0009765 A1* | 1/2013 | Gilman | B60L 53/14 | 701/1 |
| 2017/0050534 A1* | 2/2017 | Kanazawa | B60L 3/12 | |
| 2018/0031405 A1* | 2/2018 | Berentsen | B60W 50/0097 | |
| 2019/0255952 A1* | 8/2019 | Cun | B60L 53/305 | |
| 2020/0180471 A1* | 6/2020 | Tsubosaka | B60L 58/30 | |
| 2020/0256700 A1* | 8/2020 | Ota | G01C 21/343 | |
| 2020/0307621 A1* | 10/2020 | Ostrowski | G07C 5/008 | |
| 2021/0129824 A1* | 5/2021 | Sakai | B60W 20/12 | |
| 2021/0300181 A1* | 9/2021 | Sakai | G01C 21/3469 | |
| 2021/0402979 A1* | 12/2021 | Ono | B60L 58/18 | |
| 2022/0097523 A1* | 3/2022 | Ohki | B60K 35/00 | |
| 2022/0097560 A1* | 3/2022 | Sakurai | B60L 58/16 | |
| 2022/0111739 A1* | 4/2022 | Sugimoto | B60L 53/67 | |

* cited by examiner

CONTROL DEVICE, CONTROL METHOD, AND RECORDING MEDIUM

CROSS-REFERENCE TO RELATED APPLICATION

Priority is claimed on Japanese Patent Application No. 2020-063591, filed Mar. 31, 2020, the content of which is incorporated herein by reference.

BACKGROUND OF THE INVENTION

Field of the Invention

The present invention relates to a control device, a control method, and a recording medium.

Description of Related Art

Moving bodies such as four-wheeled vehicles and two-wheeled vehicles equipped with fuel cells are widespread. Fuel cells are charged at a charging station and hydrogen is replenished as fuel at a hydrogen station. When fuel cells are used in a moving body in this manner, performing control for the purpose of extending a cruising distance of the moving body by effectively using the fuel cells is known (for example, Japanese Unexamined Patent Application, First Publication No. 2016-036235).

SUMMARY OF THE INVENTION

However, the amount of charge was determined by a sense of a user of the moving body in the past. For this reason, optimum control has not been reliably performed on the consumption of power and fuel used for the moving body.

In view of the circumstances described above, aspects of the present invention have an object of providing a control device, a control method, and a recording medium that can control the amount of charge to be a more appropriate amount.

The present invention has adopted the following aspects to solve the problems described above.

(1): A control device according to one aspect of the present invention is a control device of a moving body that includes a first accumulation unit configured to accumulate first energy, a second accumulation unit configured to accumulate second energy different from the first energy, and an electric motor configured to generate power to move using any one or both of the second energy obtained by converting the first energy accumulated in the first accumulation unit and the second energy accumulated in the second accumulation unit, in which a required amount, which is an amount of the second energy required to move from a current place to a supply point that is a point where supply of the first energy is received, is acquired when the second energy is accumulated in the second accumulation unit, and if the required amount has been supplied to the second accumulation unit, a termination-related operation related to termination of the supply is executed.

(2): A control device according to another aspect of the present invention is a control device of a moving body that includes a first accumulation unit configured to accumulate first energy, a second accumulation unit configured to accumulate second energy different from the first energy, and an electric motor configured to generate power to move using any one or both of the second energy obtained by converting the first energy accumulated in the first accumulation unit and the second energy accumulated in the second accumulation unit, in which an amount of the second energy required to move from a current place to a supply point that is a point where supply of the first energy is received, is acquired when the second energy is accumulated in the second accumulation unit, and the amount of the second energy is notified of.

(3): In the aspect of (1) described above, the termination-related operation may be to notify a user of the moving body that the required amount has been supplied to the second accumulation unit.

(4): In the aspect of (1) described above, the termination-related operation may be to notify a user of the moving body that the required amount has been supplied to the second accumulation unit and to receive an instruction on whether to further continue the supply.

(5): In the aspect of (1) described above, the termination-related operation may be to stop supply of the required amount after the required amount is supplied to the second accumulation unit.

(6): In the aspect of any one of (1) to (5) described above, the control device may select a supply point which satisfies a predetermined condition of being close to a current place among a plurality of supply point candidates, as the supply point, and acquire the amount of the second energy required to move from the current place to the selected supply point.

(7): A control method according to still another aspect of the present invention is a control method that is performed by a control device of a moving body including a first accumulation unit configured to accumulate first energy, a second accumulation unit configured to accumulate second energy different from the first energy, and an electric motor configured to generate power to move using any one or both of the second energy obtained by converting the first energy accumulated in the first accumulation unit and the second energy accumulated in the second accumulation unit, and includes acquiring a required amount, which is an amount of the second energy required to move from a current place to a supply point that is a point where supply of the first energy is received, when the second energy is accumulated in the second accumulation unit, and executing, if the required amount has been supplied to the second accumulation unit, a termination-related operation related to termination of the supply.

(8): A control method according to still another aspect of the present invention is a control method that is performed by a control device of a moving body including a first accumulation unit configured to accumulate first energy, a second accumulation unit configured to accumulate second energy different from the first energy, and an electric motor configured to generate power to move using any one or both of the second energy obtained by converting the first energy accumulated in the first accumulation unit and the second energy accumulated in the second accumulation unit, and includes acquiring an amount of the second energy required to move from a current place to a supply point that is a point where supply of the first energy is received, when the second energy is accumulated in the second accumulation unit, and notifying of the amount of the second energy.

(9): A computer-readable non-transitory recording medium according to still another aspect of the present invention stores a program for causing a computer to function as the control device of any one of (1) to (6).

According to (1) to (9) described above, it is possible to control the amount of charge to be a more appropriate amount.

DETAILED DESCRIPTION OF THE INVENTION

Hereinafter, embodiments of a control device, a control method, and a recording medium according to the present invention will be described with reference to the drawings. In the embodiments, a fuel cell vehicle will be described as an example of one aspect of a moving body. A fuel cell vehicle is a vehicle that uses hydrogen, hydrogen carbide, or alcohol as fuel, and travels by supplying power extracted by an electrochemical reaction of the fuel to an electric motor. In the embodiment, hydrogen will be described as an example of one type of the fuel.

[Fuel Cell Vehicle]

Figure 1:
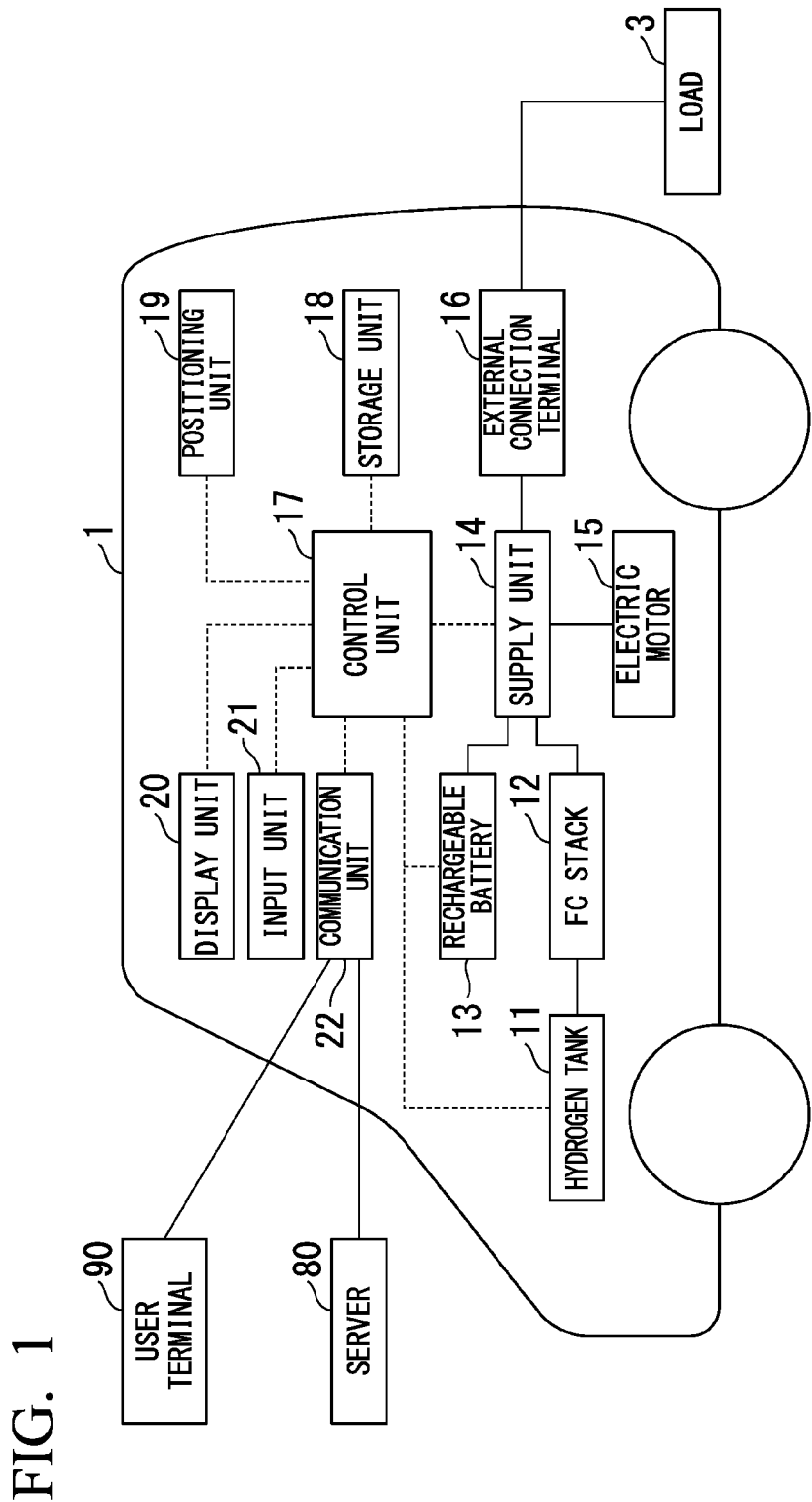
FIG. 1 is a diagram which shows a configuration example of a vehicle 1 according to an embodiment.

FIG. 1 is a diagram which shows a configuration example of a vehicle 1 according to the embodiment. The vehicle 1 is a fuel cell vehicle that includes a hydrogen tank 11, a fuel cell (FC) stack 12, a rechargeable battery 13, a supply unit 14, an electric motor 15, an external connection terminal 16, a control unit 17, a storage unit 18, a positioning unit 19, a display unit 20, an input unit 21, and a communication unit 22.

The hydrogen tank 11 accumulates hydrogen as first energy. The FC stack 12 generates power by causing hydrogen accumulated in the hydrogen tank 11 to electrochemically react with oxygen in the air, and generates electric energy (power) by the power generation. The rechargeable battery 13 accumulates power as second energy supplied from the outside or the FC stack 12 via the supply unit 14. When power is supplied to the rechargeable battery 13 from the outside, the external connection terminal 16 is used. For example, in a charging station, which is one example of a power supply station, a connector such as a charging gun is connected to the external connection terminal 16. In this case, the rechargeable battery 13 receives and accumulates the power accumulated in the charging station via the external connection terminal 16 and the supply unit 14. The rechargeable battery 13 supplies the accumulated power to the supply unit 14.

The supply unit 14 supplies the power supplied from either or both of the FC stack 12 and the rechargeable battery 13 to a load 3 that is an external device via the external connection terminal 16 or supplies the power to the electric motor 15. The supply unit 14 supplies the power supplied from the outside to the rechargeable battery 13, and causes the rechargeable battery 13 to accumulate the power. The supply unit 14 switches destinations to which power is supplied according to control by the control unit 17.

The electric motor 15 as a drive unit drives wheels provided in the vehicle 1 with the power supplied from the supply unit 14 and supplies the power for a movement of the vehicle 1. The external connection terminal 16 is connected with electric wires when the vehicle 1 supplies power to the external load 3 and when the vehicle 1 receives power supplied from the outside.

The control unit 17 is a control device that controls the supply unit 14 or causes the display unit 20 to display information on the basis of data obtained from the hydrogen tank 11, the rechargeable battery 13, the storage unit 18, the positioning unit 19, the input unit 21, and the communication unit 22. The control unit 17 includes, for example, a hardware processor such as a central processing unit (CPU), a micro controller unit (MCU), or a micro processor unit (MPU), a temporary storage memory, and a storage device. In the control unit 17, the hardware processor may control the supply unit 14 and the display unit 20 by executing one or more program modules stored in the storage device. The control unit 17 may be realized by using an electronic circuit using hardware such as a large scale integration circuit (LSI), an application specific integrated circuit (ASIC), or a field-programmable gate array (FPGA), or may also be realized by software and hardware in cooperation. Alternatively, a computer mounted in the vehicle 1 may operate as the control unit 17.

The storage unit 18 stores the data used in the control of the supply unit 14 and the display unit 20 by the control unit 17, and data generated in the control. The positioning unit 19 measures a position of the vehicle 1 and supplies the position obtained by the measurement to the control unit 17. The positioning unit 19 receives, for example, signals emitted from a plurality of artificial satellites of a satellite positioning system, and measures the position of the vehicle 1 on the basis of the received signals.

The display unit 20 is a display device that displays information according to the control by the control unit 17. The display unit 20 displays images and text and presents information to a user. The input unit 21 receives an operation of the user and supplies the received operation to the control unit 17. A touch panel, a switch, and the like are used as the input unit 21. The communication unit 22 is configured by using a communication device. The communication unit 22 may perform data communication with another device by, for example, communicating with a base station of a moving body communication network. The communication unit 22 may perform data communication with a device positioned at a short distance (for example, a user terminal 90) by, for example, performing short-distance wireless communication.

The server 80 is a device that provides information to and performs control processing on the vehicle 1. The server 80 communicates with the control unit 17 of the vehicle 1 via a communication route such as the Internet or a moving body communication network and the communication unit 22. The server 80 may perform a part of processing of the control unit 17. The server 80 may also be configured as a device provided in a charging station.

The user terminal 90 is, for example, a communicable information processing device such as a mobile phone, a smartphone, a tablet, a wearable device, or a game device. The user terminal 90 performs data communication with the vehicle 1. The user terminal 90 displays images or character strings on the screen on the basis of the data received from the control unit 17 of the vehicle 1. The user terminal 90 transmits, for example, information indicating an instruction regarding an operation of the vehicle 1 to the vehicle 1 in response to an operation of the user.

A distance that the vehicle 1 can move with an amount of hydrogen filled in the hydrogen tank 11 is longer than a distance that the vehicle 1 can move with an amount of power filled in the rechargeable battery 13. This is because an amount of energy that can be extracted from the hydrogen filled in the hydrogen tank 11 is larger than an amount of energy that can be accumulated in the rechargeable battery 13. Since a time required to charge the rechargeable battery 13 at a charging station is often longer than a time required to replenish the hydrogen tank 11 with hydrogen at a hydrogen station, it is often preferable to reduce the number of times the rechargeable battery 13 is charged and the charging time at the charging station. An energy replenishment time per traveling distance is shorter for hydrogen replenishment than for power charging, and cost required per traveling distance may be cheaper for hydrogen replenishment than for power charging.

[Control Processing by Control Device (Control Unit 17)]

Figure 2:
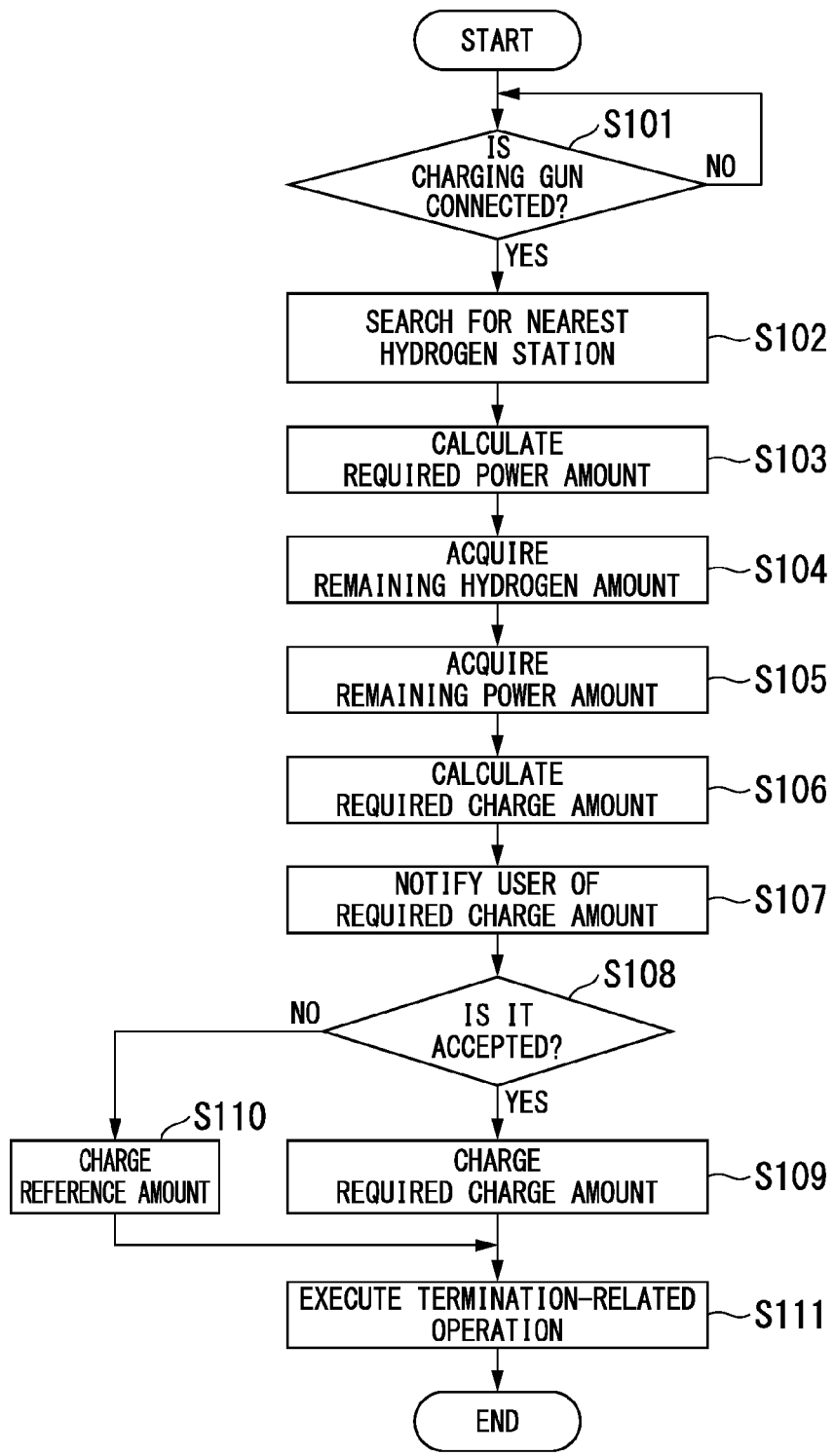
FIG. 2 is a flowchart which shows an example of charging control processing performed by a control unit 17 in the embodiment.

Hereinafter, the charging control processing performed by the control unit 17 will be described with reference to FIG. 2. FIG. 2 is a flowchart which shows an example of the charging control processing performed by the control unit 17 in the embodiment. The control unit 17 does not start charging control processing until a charging gun is connected to the external connection terminal 16 (NO in step S101). If the charging gun is connected to the external connection terminal 16 (YES in step S101), the control unit 17 searches for a nearest hydrogen station (step S102).

The nearest hydrogen station may be, for example, a hydrogen station with a shortest distance on an available route from a current position, or a hydrogen station with a shortest linear distance. This may be a hydrogen station for which a time required to reach it on the available route from the current position is estimated to be shortest. Candidates for the hydrogen station to be searched may be limited to, for example, hydrogen stations positioned in a direction of the destination of the vehicle 1. The destination may be, for example, a position input as a destination by the user. In this case, hydrogen stations positioned inside a fan shape having a predetermined angle with respect to a straight line from the current position to the destination may be selected as the candidates. For the direction of the destination, the direction of the destination may be estimated on the basis of a movement history up to a present time. The control unit 17 may select a plurality of hydrogen stations as candidates for the nearest hydrogen station and display them on the display unit 20. In this case, the nearest hydrogen station desired by the user may also be selected using the input unit 21.

When the nearest hydrogen station is determined, the control unit 17 calculates the amount of power required to move from a current place to the nearest hydrogen station (hereinafter referred to as a "required power amount") (step S103). Any existing algorithm may be used to calculate this amount of power. For example, the required power amount may be calculated by considering not only a distance from the current place to the nearest hydrogen station but also the amount of power required when traveling on a slope based on differences in elevation.

The control unit 17 acquires a remaining amount of hydrogen accumulated in the hydrogen tank 11 (step S104). The remaining amount of hydrogen accumulated in the hydrogen tank 11 may be acquired from, for example, a sensor provided in the hydrogen tank 11. The control unit 17 acquires a remaining amount of power accumulated in the rechargeable battery 13 (step S105). The remaining amount of power accumulated in the rechargeable battery 13 may be acquired from, for example, a sensor provided in the rechargeable battery 13.

The control unit 17 calculates a required charge amount on the basis of the required power amount, the remaining amount of hydrogen, and the remaining amount of power (step S106). The required charge amount indicates a minimum charge amount required at a charging station of a current place in order for the vehicle 1 to move to the nearest hydrogen station. That is, when the nearest hydrogen station cannot be reached even if the remaining amount of hydrogen and the remaining amount of power are used, the amount of power required for the vehicle 1 to move a remaining distance may be the required charge amount. For example, if the vehicle 1 can move from the current place to the nearest hydrogen station with only the remaining amount of hydrogen and the remaining amount of power, the required charge amount may be zero. A predetermined margin may also be provided in calculating of the required charge amount.

The control unit 17 notifies the user of the calculated value of the required charge amount (step S107). The notification of the required charge amount may be performed, for example, by displaying an image, a numerical value, or character strings indicating a value of the required charge amount on the display unit 20, or may be performed by outputting a voice indicating the value of the required charge amount from a speaker (not shown). The notification of the required charge amount may also be performed by, for example, being transmitted to the user terminal 90 via the communication unit 22. In this case, the user terminal 90 may display an image, a numerical value, or character strings indicating a value of the notified required charge amount on the screen, or output a voice indicating the value of the notified required charge amount from the speaker.

Thereafter, the control unit 17 receives an instruction from the user. When the received instruction indicates that the required charge amount is to be charged (YES in step S108), the control unit 17 performs charging until the required charge amount is reached (step S109). On the other hand, when the received instruction indicates that a reference amount is to be charged (NO in step S108), the control unit 17 performs charging only of an amount indicated by a value defined by another standard, instead of the required charge amount (step S110). The reference amount may be the charge amount of the rechargeable battery 13 which is fully charged, or may be a predetermined amount determined in advance.

If the charge amount reaches the required charge amount or the reference amount, the control unit 17 executes a termination-related operation (step S111). The termination-related operation is an operation related to terminating a charge at a charging station at a current place. The termination-related operation may be, for example, an operation of notifying the user that the charge amount has reached the required charge amount or the reference amount. The notification in this case may be implemented using the display unit 20 or a speaker (not shown), or may be implemented by communicating with the user terminal 90.

The termination-related operation may be, for example, an operation of notifying the user that the charge amount has reached the required charge amount or the reference amount, and further requesting an instruction on whether to stop charging. The notification in this case may be implemented using the display unit 20 or a speaker (not shown), or may be performed by communicating with the user terminal 90.

The instruction on whether to stop by the user may be made by, for example, using the input unit 21 or may also be made in the user terminal 90. When an instruction is made in the user terminal 90, the user terminal 90 transmits data indicating content of the instruction to the vehicle 1. The control unit 17 determines whether to continue or stop charging the rechargeable battery 13 according to the instruction from the user on whether to stop, and controls the charge according to a result of the determination.

The termination-related operation may also be, for example, an operation of automatically terminating the charge to the rechargeable battery 13.

Some or all of the processing shown in FIG. 2 may be performed by the server 80.

Figure 3:
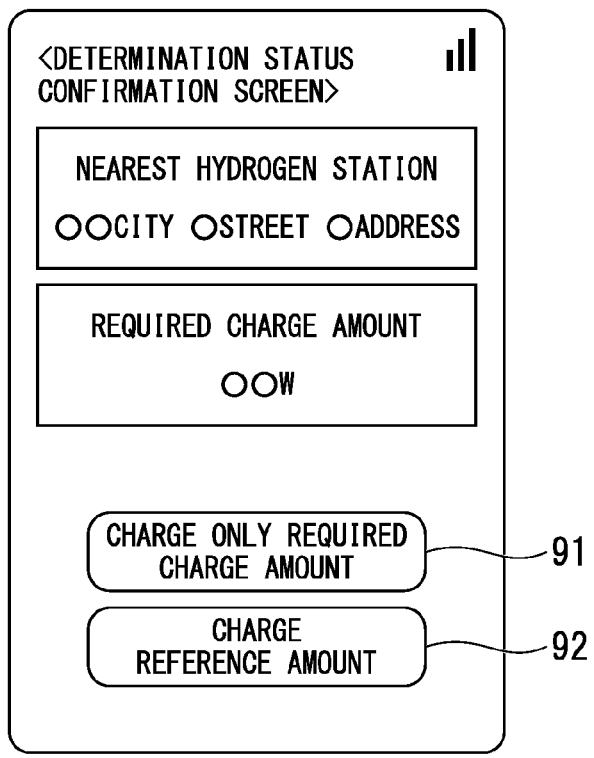
FIG. 3 is a diagram which shows a display example of a screen of a user terminal 90.

FIG. 3 is a diagram which shows a display example of the screen of the user terminal 90. For example, when processing of notifying the user of the required charge amount (S107 in FIG. 2) is performed, a screen like that shown in FIG. 3 may be displayed on the user terminal 90. This screen shows information indicating a position (for example, an address) of the nearest hydrogen station and the value of the required charge amount. Furthermore, two operation buttons (91 and 92) are displayed on this screen. The operation button 91 is a button that the user operates to instruct that only the required charge amount is to be charged. When the operation button 91 is operated, YES is determined in step S108 and the processing proceeds to step S109 in the flowchart of FIG. 2. The operation button 92 is a button that the user operates to instruct that the reference amount is to be charged. When the operation button 92 is operated, NO is determined in step S108 and the processing proceeds to step S110 in the flowchart of FIG. 2.

Figure 4:
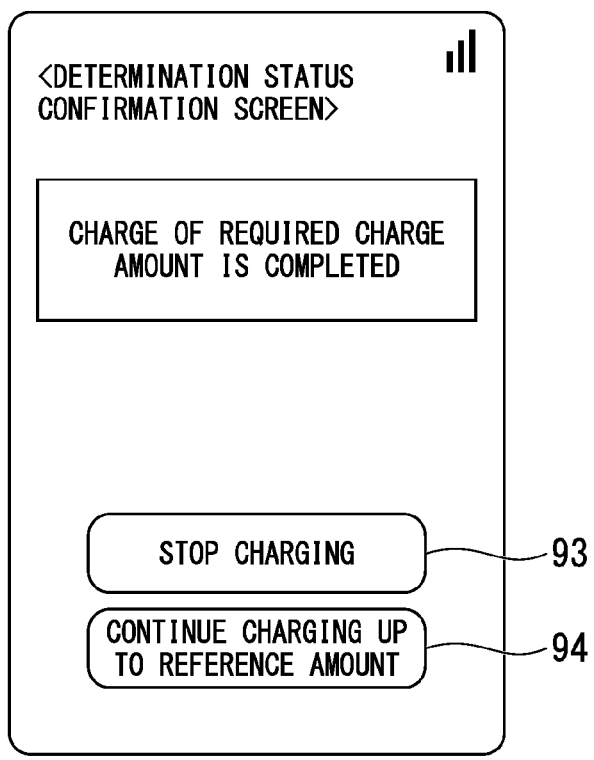
FIG. 4 is a diagram which shows a display example of the screen of the user terminal 90.

FIG. 4 is a diagram which shows a display example of the screen of the user terminal 90. For example, as the termination-related operation, when an operation of notifying that the charge amount has reached the required charge amount or the reference amount and further requesting an instruction on whether to stop charging is performed, a screen as shown in FIG. 4 may be displayed in the user terminal 90. On this screen, character strings are displayed, which indicates that a charge of the required charge amount has been terminated. Furthermore, two operation buttons (93 and 94) are displayed on this screen. The operation button 93 is a button that the user operates to instruct that charging is to be stopped. When the operation button 93 is operated, the control unit 17 stops charging. The operation button 94 is a button that the user operates to instruct that charging is to be continued up to the reference amount. When the operation button 94 is operated, the control unit 17 continues charging up to the reference amount. After that, if the amount of charge reaches the reference amount, a screen shown in FIG. 4 may be displayed on the user terminal 90 together with character strings indicating "a charge of the reference amount is completed."

In the control unit 17 of the vehicle 1 configured in this manner, the amount of charge (required charge amount) required to move to the nearest hydrogen station is calculated and the required charge amount is notified to the user at a charging station. The required charge amount indicates the minimum charge amount required for the vehicle 1 to move to the nearest hydrogen station. Upon receiving such a notification, the user can perform charging according to the required charge amount as needed. For example, it is possible to head to the nearest hydrogen station by charging only the same amount as the required charge amount. For this reason, it is possible to prevent a situation in which charging is performed more than necessary or a situation in which the vehicle cannot move to the nearest hydrogen station due to an insufficient amount of charge, and to control the amount of charge to be a more appropriate amount.

In the control unit 17 of the vehicle 1 configured in this manner, the required charge amount is calculated and the termination-related operation is executed. The termination-related operation is an operation related to terminating a charge at a charging station and is, for example, an operation of notifying the user that the amount of charge has reached the required charge amount. Upon receiving such a notification, the user can terminate the charge according to the required charge amount as needed. For example, it is possible to terminate the charge when the required charge amount is charged and head to the nearest hydrogen station. For this reason, it is possible to prevent a situation in which charging is performed more than necessary or a situation in which the vehicle cannot move to the nearest hydrogen station due to an insufficient charging amount, and to control the amount of charge to be a more appropriate amount.

The embodiment described above can be expressed as follows.

A control device is a control device of a moving body that includes a first accumulation unit configured to accumulate first energy, a second accumulation unit configured to accumulate second energy different from the first energy, and an electric motor configured to generate power to move using any one or both of second energy obtained by converting first energy accumulated in the first accumulation unit and second energy accumulated in the second accumulation unit, and is configured to include a storage device or a memory that stores a program module, and a hardware processor, when the hardware processor executes the program module, to acquire a required amount, which is an amount of the second energy required to move from a current place to a supply point that is a point where supply of the first energy is received, when the second energy is accumulated in the second accumulation unit and to execute, if the required amount has been supplied to the second accumulation unit, a termination-related operation related to termination of the supply.

The embodiment described above can also be expressed as follows.

A control device is a control device of a moving body that includes a first accumulation unit configured to accumulate first energy, a second accumulation unit configured to accumulate second energy different from the first energy, and an electric motor configured to generate power to move using any one or both of second energy obtained by converting first energy accumulated in the first accumulation unit and second energy accumulated in the second accumulation unit, and is configured to include a storage device or a memory that stores a program module, and a hardware processor, when the hardware processor executes the program module, to acquire an amount of the second energy, required to move from a current place to a supply point that is a point where supply of the first energy is received, when the second energy is accumulated in the second accumulation unit, and to notify the amount of the second energy.

Although the modes for implementing the present invention have been described as above using the embodiments, the present invention is not limited to these embodiments, and various modifications and substitutions can be added within a range not departing from the gist of the present invention. For example, although an example in which the vehicle 1 is a fuel cell car has been described, a car equipped with a generator combined with an internal combustion engine instead of the FC stack 12 may be used as the vehicle 1. In this case, the vehicle 1 includes a fuel tank (a first accumulation unit) that accumulates fuel other than hydrogen, for example, gasoline or light oil, instead of the hydrogen tank 11.

What is claimed is:

1. A control device of a moving body that includes a first accumulation unit representative of a holding tank and configured to accumulate hydrogen, a second accumulation unit representative of a battery and configured to accumulate power, and an electric motor configured to generate power to move using any one or both of the power obtained by converting the hydrogen accumulated in the first accumulation unit and the power accumulated in the second accumulation unit, wherein the control device of the moving comprises a processor, and
wherein a required amount, which is an amount of the power required to move from a current place to a supply point that is a point where supply of the hydrogen is received, is acquired when the power is accumulated in the second accumulation unit, and if the required amount has been supplied to the second accumulation unit, a termination-related operation related to termination of the supply is executed.

2. The control device according to claim 1,
wherein the termination-related operation is to notify a user of the moving body that the required amount has been supplied to the second accumulation unit.

3. The control device according to claim 1,
wherein the termination-related operation is to notify a user of the moving body that the required amount has been supplied to the second accumulation unit and to receive an instruction on whether to further continue the supply.

4. The control device according to claim 1,
wherein the termination-related operation is to stop supply of the required amount after the required amount is supplied to the second accumulation unit.

5. The control device according to claim 1,
wherein the control device selects a supply point that satisfies a predetermined condition of being close to a current place among a plurality of supply point candidates as the supply point, and acquires the amount of the power required to move from the current place to the selected supply point.

6. The control device according to claim 1, further comprising a communication unit configured to perform data communication with a terminal by performing short-distance wireless communication,
wherein the termination-related operation is to notify the terminal by the communication unit that the required amount has been supplied to the second accumulation unit.

7. A control method that is performed by a control device of a moving body including a first accumulation unit representative of a holding tank and configured to accumulate hydrogen, a second accumulation unit representative of a battery and configured to accumulate power, and an electric motor configured to generate power to move using any one or both of the power obtained by converting the hydrogen accumulated in the first accumulation unit and the power accumulated in the second accumulation unit, the method comprising:
acquiring a required amount, which is an amount of the power required to move from a current place to a supply point that is a point where supply of the hydrogen is received, when the power is accumulated in the second accumulation unit; and
executing, if the required amount has been supplied to the second accumulation unit, a termination-related operation related to termination of the supply.

8. The control method according to claim 7, further comprising performing data communication with a terminal by performing short distance wireless communication,
wherein the termination-related operation notifies the terminal that the required amount has been supplied to the second accumulation unit.

9. A control method that is performed by a control device of a moving body including a first accumulation unit representative of a holding tank and configured to accumulate hydrogen, a second accumulation unit representative of a battery and configured to accumulate power, and an electric motor configured to generate power to move using any one or both of the power obtained by converting the hydrogen accumulated in the first accumulation unit and the power accumulated in the second accumulation unit, the method comprising:
acquiring an amount of the power required to move from a current place to a supply point that is a point where supply of the hydrogen is received, when the power is accumulated in the second accumulation unit; and
notifying of the amount of the power.

10. The control method according to claim 9, further comprising performing data communication with a terminal by performing short distance wireless communication,
wherein a termination-related operation notifies the terminal that a required amount has been supplied to the second accumulation unit.

* * * * *